United States Patent
Tsumagari (10) Patent No.: US 7,915,780 B2
(45) Date of Patent: Mar. 29, 2011

(54) LAMINATED SPIRAL CORE, DYNAMO-ELECTRIC-MACHINE ROTOR PROVIDED THEREWITH, AND DYNAMO-ELECTRIC MACHINE

(75) Inventor: Hiroshi Tsumagari, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 12/841,178

(22) Filed: Jul. 22, 2010

(65) Prior Publication Data
US 2010/0283351 A1    Nov. 11, 2010

Related U.S. Application Data

(63) Continuation of application No. PCT/JP2008/071659, filed on Nov. 28, 2008.

(30) Foreign Application Priority Data

Jan. 22, 2008  (JP) ................... 2008-011803

(51) Int. Cl.
*H02K 15/03* (2006.01)
*H02K 1/28* (2006.01)

(52) U.S. Cl. ... 310/216.044; 310/216.113; 310/216.041; 310/216.048

(58) Field of Classification Search ........... 310/216.041, 310/216.043, 156.53, 216.044, 216.048, 310/216.113, 216.047, 216.013; 29/598
See application file for complete search history.

(56) References Cited

U.S. PATENT DOCUMENTS

| | | | |
|---|---|---|---|
| 7,378,774 B2 * | 5/2008 | Torii et al. | ............ 310/216.041 |
| 2007/0046125 A1 | 3/2007 | Torii et al. | |
| 2007/0126304 A1 | 6/2007 | Ito et al. | |
| 2008/0098587 A1 | 5/2008 | Mitsui et al. | |
| 2009/0146519 A1 * | 6/2009 | Myojin | ................... 310/156.53 |

FOREIGN PATENT DOCUMENTS

| JP | 11-206051 | 7/1999 |
|---|---|---|
| JP | 2001-157396 | 6/2001 |
| JP | 2005-137117 | 5/2005 |
| JP | 2005-168128 | 6/2005 |
| JP | 2006-166498 | 6/2006 |
| JP | 2007-68310 | 3/2007 |
| JP | 2007-159196 | 6/2007 |

OTHER PUBLICATIONS

International Search Report for International Application No. PCT/JP2008/071659, Mar. 3, 2009.
Written Opinion of the International Searching Authority for International Application No. PCT/JP2008/071659, Mar. 3, 2009.

* cited by examiner

*Primary Examiner* — Burton Mullins
(74) *Attorney, Agent, or Firm* — Ditthavong Mori & Steiner, P.C.

(57) ABSTRACT

A laminated spiral core includes core units and a plurality of swage portions. The core units form a rotor core. The core units have permanent-magnet attachment portions in which permanent magnets are to be disposed. Each of the core units has an arc shape. The plurality of swage portions connect the core units by swage-joining when the core units are spirally stacked in a predetermined number of layers. The plurality of swage portions are provided in the core units in a wave-shape to face the permanent-magnet attachment portions and provided at positions where an influence of magnetic flux paths in a rotor is minimal.

14 Claims, 8 Drawing Sheets

LAMINATED SPIRAL CORE, DYNAMO-ELECTRIC-MACHINE ROTOR PROVIDED THEREWITH, AND DYNAMO-ELECTRIC MACHINE

CROSS-REFERENCE TO RELATED APPLICATIONS

The present application is a continuation application of PCT/JP2008/071659, filed Nov. 28, 2008 titled "LAMINATED WOUND CORE AND ROTOR EQUIPPED WITH THE CORE, DYNAMO-ELECTRIC MACHINE", which claims priority to Japanese Patent Application No. 2008-011803, filed Jan. 22, 2008. The contents of these applications are incorporated herein by reference in their entirety.

BACKGROUND OF THE INVENTION

1. Field of the Invention

The present invention relates to a laminated spiral core, a dynamo-electric-machine rotor provided therewith, and a dynamo-electric machine.

2. Description of the Related Art

Hitherto, laminated spiral cores used for rotors that are used in dynamo-electric machines such as motors or electric generators can be produced in short times by shifting positions of core division portions in the circumferential direction every time roll-up is performed by simply rolling up arc-shaped core units, which have been produced by being punched out of a hoop material, while bending the core units. Thus, the laminated spiral cores for rotors have been broadly employed as laminated cores that can be produced with an excellent productivity and that can be used for dynamo-electric machines.

Such a laminated spiral core used for a dynamo-electric machine is configured, for example, as described in Japanese Unexamined Patent Application Publication No. 2007-68310 laid open on Mar. 15, 2007.

SUMMARY OF THE INVENTION

According to one aspect of the present invention, a laminated spiral core includes core units and a plurality of swage portions. The core units form a rotor core. The core units have permanent-magnet attachment portions in which permanent magnets are to be disposed. Each of the core units has an arc shape. The plurality of swage portions connect the core units by swage-joining when the core units are spirally stacked in a predetermined number of layers. The plurality of swage portions are provided in the core units in a wave-shape to face the permanent-magnet attachment portions and provided at positions where an influence of magnetic flux paths in a rotor is minimal.

BRIEF DESCRIPTION OF THE DRAWINGS

The present invention will be described in further detail with reference to the accompanying drawings wherein.

DETAILED DESCRIPTION OF THE EMBODIMENTS

Hereinafter, embodiments of the present invention will be described with reference to the accompanying drawings. Note that, in a first embodiment and subsequent embodiments of the present invention, reference symbols or reference numerals that are identical to those in the first embodiment denote the same elements. A detailed description thereof is omitted, and only differences are mainly described.

First Embodiment

Figure 1A:
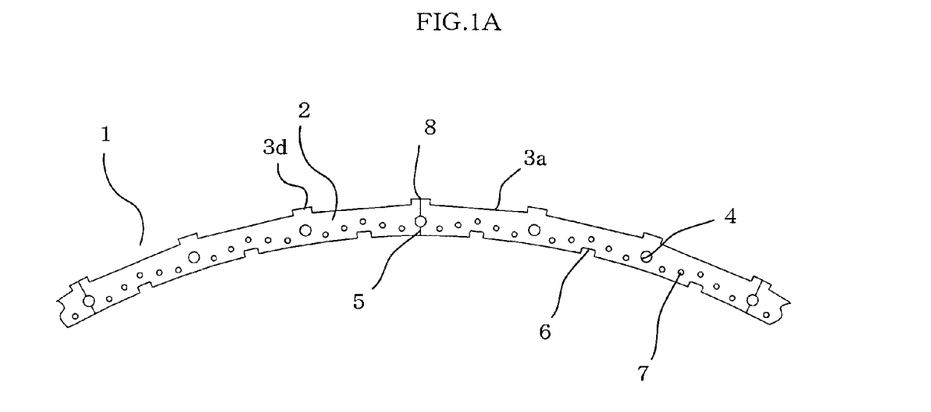
FIG. 1A is a front view of core units constituting a laminated spiral core, which is used for a rotor, according to a first embodiment of the present invention, and illustrates a state in which the arc-shaped core units that are produced by being punched out of a hoop material are bent and contact each other.
Figure 1B:
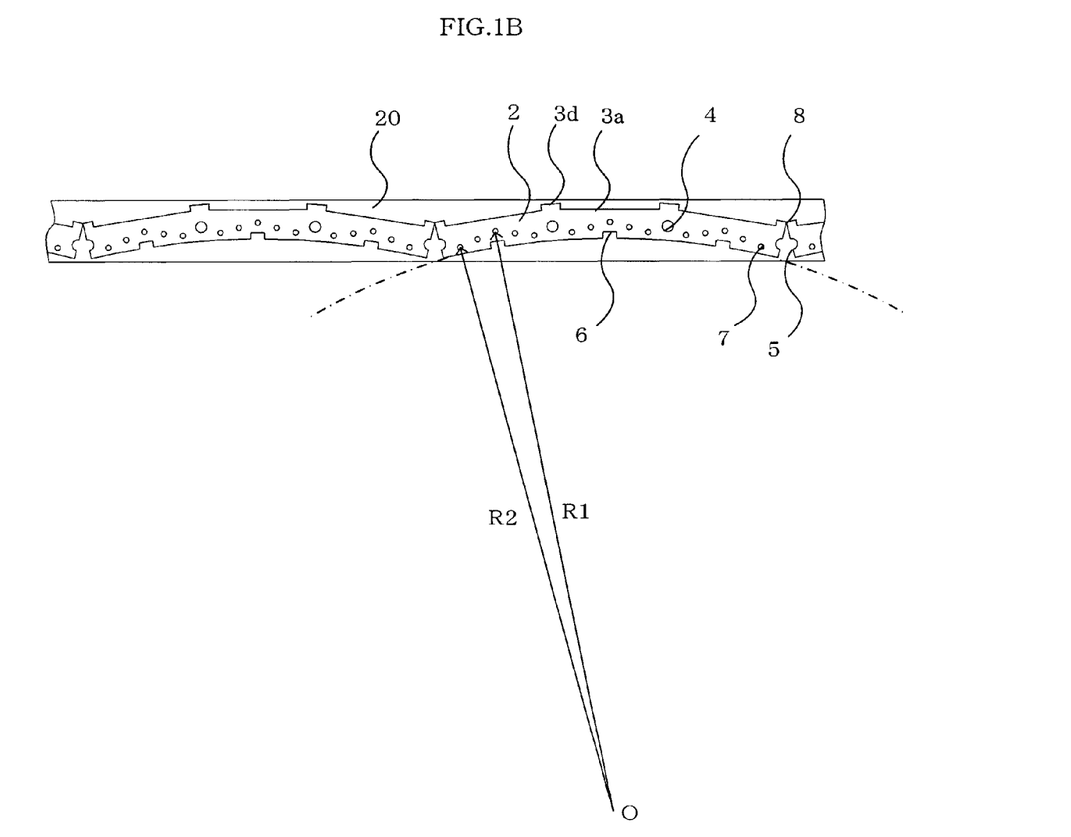
FIG. 1B is a front view of the arc-shaped core units, which are illustrated in FIG. 1A, in a state in which the core units are to be punched out of the hoop material.

FIG. 1A is a front view of core units constituting a laminated spiral core, which is used for a rotor, according to a first embodiment of the present invention, and illustrates a state in which the arc-shaped core units that are produced by being punched out of a hoop material are bent and contact each other. FIG. 1B is a front view of the arc-shaped core units, which are illustrated in FIG. 1A, in a state in which the core units are to be punched out of the hoop material.

In FIGS. 1A and 1B, reference numeral 1 denotes a laminated spiral core. Reference numeral 2 denotes a core unit. Reference numeral 3a denotes a permanent-magnet attachment portion. Reference numeral 3d denotes a permanent-magnet positioning protrusion. Reference numeral 4 denotes a pilot hole. Reference numeral 5 denotes a slit. Reference numeral 6 denotes a rotor keyway. Reference numeral 7 denotes a swage portion. Reference numeral 8 denotes a bridging portion. Reference numeral 20 denotes a hoop material.

Features of the present embodiment are as follows.

The core unit 2 in the present embodiment is configured so that the permanent-magnet attachment portions 3a in which permanent magnets are to be disposed are formed with the same pitch on the outer circumferential surface of the core unit 2 in the circumferential direction. A case is illustrated, in which the laminated spiral core is applied to a rotor core used for a so-called surface permanent magnet motor (SPM).

In other words, the laminated spiral core 1 used for a rotor includes the arc-shaped core units 2 and the swage portions 7. The arc-shaped core units 2 have the permanent-magnet attachment portions 3a in which permanent magnets are to be disposed, and are used to form a rotor core. The swage portions 7 are formed in the core units 2 so that the core units 2 are joined to each other by swage-joining when the core units 2 are spirally stacked in a predetermined number of layers. In the laminated spiral core 1, the swage portions 7 are provided in the core units 2 in a wave-like arrangement so as to be opposite the permanent-magnet attachment portions 3a and provided at positions where an influence that the magnetic flux paths of the rotor have on portions of the core units 2 is minimal. Here, the core units 2 are formed using the hoop material 20 that is made of a magnetic steel sheet.

More specifically, among the swage portions 7 that are disposed in the core units 2, the swage portions 7 that are disposed (at positions that are a radius R1 distant from a center O of an arc of the core units 2) along central axes that are positioned substantially at the centers of the individual permanent-magnet attachment portions 3a in the radial directions extending from the center of the arc of the core units 2 to the permanent-magnet attachment portions 3a are provided closer to an inner circumferential side of the permanent-magnet attachment portions 3a than the swage portions 7 that are disposed (at positions that are a radius R2 distant from the center O of the arc) so as to be positioned substantially at the ends of the individual permanent-magnet attachment portions 3a in the radial directions extending from the center of the arc of the core units 2 to the permanent-magnet attachment portions 3a (R1>R2).

Furthermore, the core units 2 have the pilot holes 4 for positioning the core units 2 that are spirally stacked in the layers. On the faces of the core units 2 that are opposite, in the radial directions, the faces of the core units 2 on which the permanent-magnet attachment portions 3a are formed, the rotor keyways 6 for positioning the rotor core when the rotor core is fitted to a shaft, which is not illustrated, are provided.

Here, the pilot holes 4 are formed along central axes that are substantially centrally positioned (the permanent-magnet positioning protrusions 3d) between the permanent-magnet attachment portions 3a in the core units 2. The pilot holes 4 and the rotor keyways 6 are disposed so as to be positionally shifted from each other in the circumferential direction. Note that, in order that the core units 2 be continuously in contact with each other when the core units 2 are spirally stacked in the predetermined number of layers, the slits 5 whose width gradually decreases in a direction from one side to the other side of the end portions of the core units 2 are provided, and the bridging portions 8 are provided between the slits 5 and the other side of the core units 2.

Next, production of the laminated spiral core will be described.

The laminated spiral core 1 is unified as a cylindrical laminated product by closing the slits 5 while portions between the individual arc-shaped core units 2 are bent around the bridging portions 8, and by sequentially performing swage-joining on the laminated spiral core 1 at positions of the swage portions 7 when the core units 2 are spirally stacked in the predetermined number of layers. In this case, when the core units 2 are spirally stacked in the predetermined number of layers in the axial direction, jigs are inserted into the pilot holes 4 in advance. However, the jigs are removed from the pilot holes 4 after the laminated product is completed.

In this manner, a product that is obtained by unifying the laminated spiral core 1 as a laminated product is configured as a rotor core, and permanent magnets are inserted into the permanent-magnet attachment portions 3a, whereby a rotor, which is described below, is completed. Here, the rotor is fitted to the shaft by utilizing the rotor keyways that are provided in the core units. Note that, regarding swaging, swage-joining may be finally performed after the slits 5 have been closed while the portions between the individual arc-shaped core units 2 are bent and the core units 2 are spirally stacked in the predetermined number of layers.

Here, in the related art (Japanese Unexamined Patent Application Publication No. 2007-68310), sleeves are inserted into through holes, and arc-shaped core units are held in position therebetween by swaging the ends of the sleeves, thereby configuring a laminated spiral core. Basically, the object and function of the through holes in the related art are different from those of the pilot holes in the present embodiment.

Accordingly, in the first embodiment, necessary magnetic characteristics of the motor can be ensured by using the arrangement of the positions of the swage portions of the core units of the laminated spiral core that is determined with consideration of magnetic flux densities and magnetic flux flows. In addition, the amount of core material can be reduced to a minimum necessary for the laminated spiral core with which a rotor core is to be configured. Moreover, the laminated spiral core can be inexpensively produced with an excellent productivity. Furthermore, the laminated spiral core that is realized using the most appropriate arrangement of the positions of the swage portions that is determined with consideration of influences of the magnetic characteristics can minimize the influences of the magnetic characteristics to the output performance of the motor.

Second Embodiment

Figure 2A:
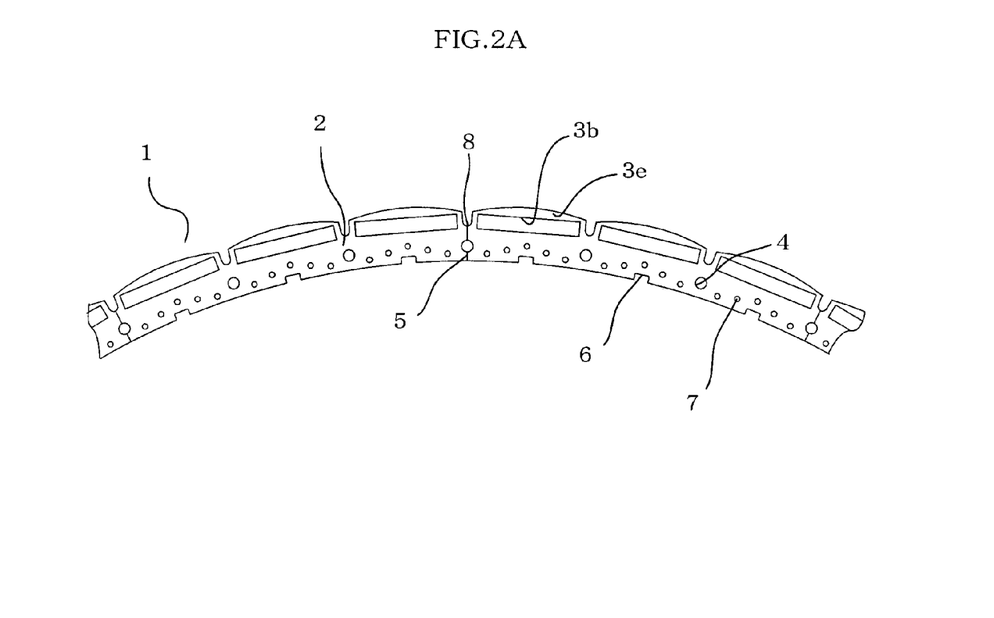
FIG. 2A is a front view of core units constituting a laminated spiral core, which is used for a rotor, according to a second embodiment of the present invention, and illustrates a state in which the arc-shaped core units that are produced by being punched out of a hoop material are bent and contact each other.
Figure 2B:
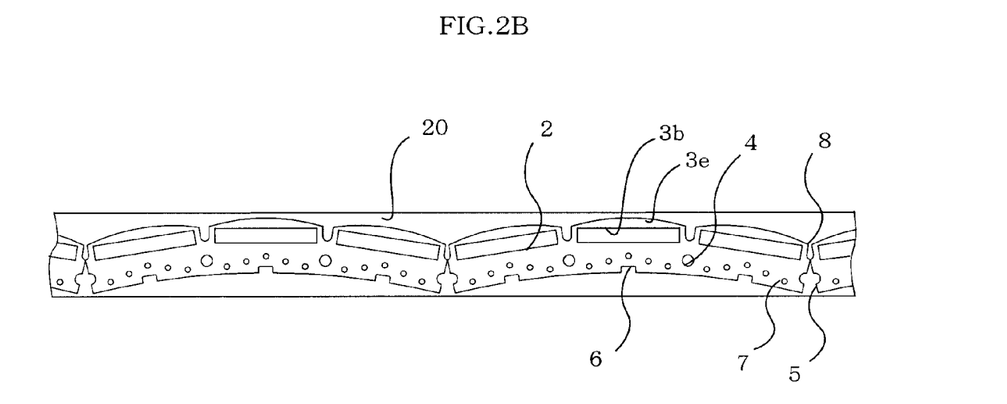
FIG. 2B is a front view of the arc-shaped core units, which are illustrated in FIG. 2A, in a state in which the core units are to be punched out of the hoop material.

FIG. 2A is a front view of core units constituting a laminated spiral core, which is used for a rotor, according to a second embodiment of the present invention, and illustrates a state in which the arc-shaped core units that are produced by being punched out of a hoop material are bent and contact each other. FIG. 2B is a front view of the arc-shaped core units, which are illustrated in FIG. 2A, in a state in which the core units are to be punched out of the hoop material.

In FIGS. 2A and 2B, reference numeral 3b denotes permanent-magnet insertion hole, and reference numeral 3e denotes a core magnetic-pole portion.

The differences between the second embodiment and the first embodiment are as follows.

In other words, the core units 2 in the present embodiment have the following configuration: the permanent-magnet insertion holes 3b, in which permanent magnets are to be inserted, are formed inside the core units 2 in the circumferential direction with the same pitch; and only magnetic-pole portions (the core magnetic-pole portions 3e), in which the permanent-magnet insertion holes 3b are to be provided, of the core units 2 are formed so as to project from the core units 2 in the radial directions. In the present embodiment, a case is illustrated, in which the laminated spiral core is applied to a rotor core of a so-called interior permanent magnet motor (IPM).

A case in which the laminated spiral core is applied to an interior permanent magnet motor is described in the second embodiment. However, as in the first embodiment, necessary magnetic characteristics of the motor can be ensured by using the arrangement of the positions of the swage portions of the laminated spiral core that is determined with consideration of magnetic flux densities and magnetic flux flows. In addition, the amount of core material can be reduced to a minimum necessary for the laminated spiral core. Moreover, the laminated spiral core can be inexpensively produced with an excellent productivity. Furthermore, the laminated spiral core that is realized using the most appropriate arrangement of the positions of the swage portions can minimize the influences of the magnetic characteristics to the output performance of the motor.

Third Embodiment

Figure 3A:
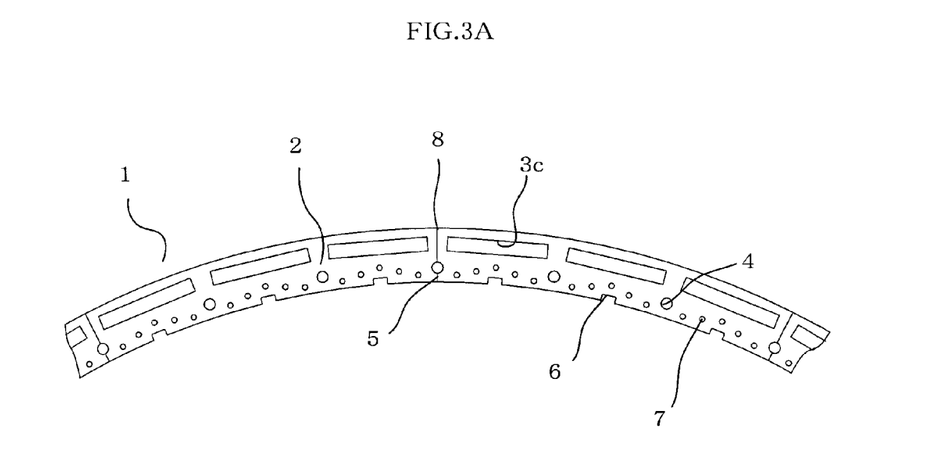
FIG. 3A is a front view of core units constituting a laminated spiral core, which is used for a rotor, according to a third embodiment of the present invention, and illustrates a state in which the arc-shaped core units that are produced by being punched out of a hoop material are bent and contact each other.
Figure 3B:
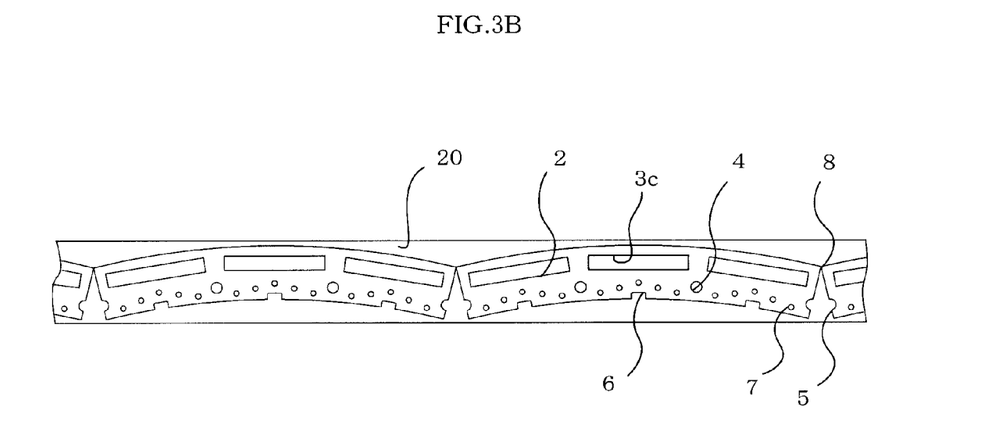
FIG. 3B is a front view of the arc-shaped core units, which are illustrated in FIG. 3A, in a state in which the core units are to be punched out of the hoop material.

FIG. 3A is a front view of core units constituting a laminated spiral core, which is used for a rotor, according to a third embodiment of the present invention, and illustrates a state in which the arc-shaped core units that are produced by being punched out of a hoop material are bent and contact each other. FIG. 3B is a front view of the arc-shaped core units, which are illustrated in FIG. 3A, in a state in which the core units are to be punched out of the hoop material.

In FIGS. 3A and 3B, reference numeral 3c denotes permanent-magnet insertion hole.

Regarding the differences between the third embodiment and the second embodiment, the core units 2 have a configuration in which the core magnetic-pole portions 3e are not provided and permanent-magnet insertion holes 3c are formed inside the core units 2 in the circumferential direction, instead of the configuration, in which the core units 2 have the permanent-magnet insertion holes 3b that are provided inside the core magnetic-pole portions 3e projecting from the core units 2 in the radial directions, in the second embodiment. Also in the present embodiment, a case is illustrated, in which the laminated spiral core is applied to a rotor core of an IPM.

Accordingly, a case in which the laminated spiral core is applied to an interior permanent magnet is described in the third embodiment as in the second embodiment. However, as in the second embodiment, necessary magnetic characteristics of the motor can be ensured by using the arrangement of the positions of the swage portions of the laminated spiral core that is determined with consideration of magnetic flux densities and magnetic flux flows. In addition, the amount of core material can be reduced to a minimum necessary for the laminated spiral core. Moreover, the laminated spiral core can be inexpensively produced with an excellent productivity. Furthermore, the laminated spiral core that is realized using the most appropriate arrangement of the positions of the swage portions can minimize the influences of the magnetic characteristics to the output performance of the motor.

Fourth Embodiment

Figure 4A:
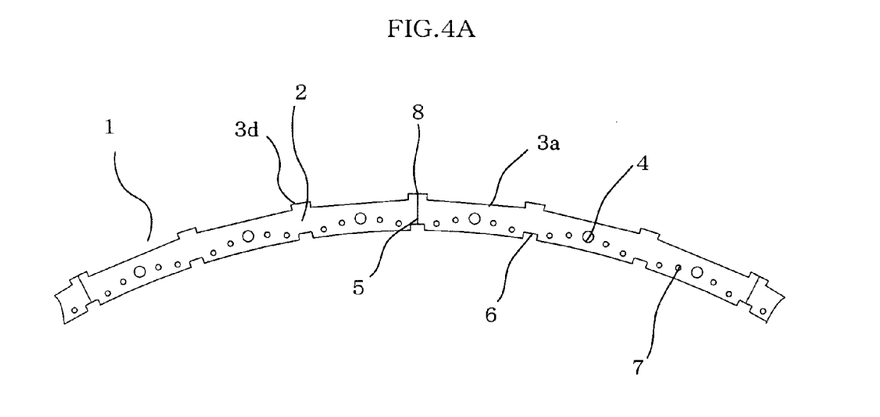
FIG. 4A is a front view of core units constituting a laminated spiral core, which is used for a rotor, according to a fourth embodiment of the present invention, and illustrates a state in which the arc-shaped core units that are produced by being punched out of a hoop material are bent and contact each other.
Figure 4B:
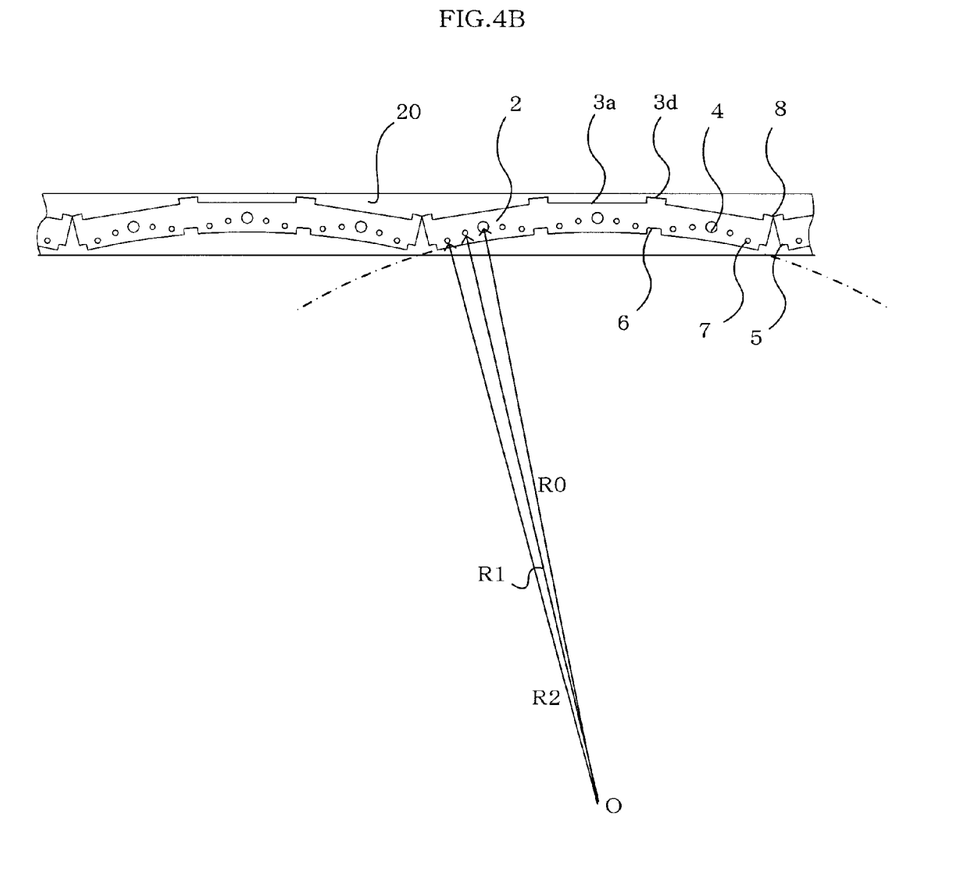
FIG. 4B is a front view of the arc-shaped core units, which are illustrated in FIG. 4A, in a state in which the core units are to be punched out of the hoop material.

FIG. 4A is a front view of core units constituting a laminated spiral core, which is used for a rotor, according to a fourth embodiment of the present invention, and illustrates a state in which the arc-shaped core units that are produced by being punched out of a hoop material are bent and contact each other. FIG. 4B is a front view of the arc-shaped core units, which are illustrated in FIG. 4A, in a state in which the core units are to be punched out of the hoop material.

The differences between the fourth embodiment and the first embodiment are that the pilot holes 4 are formed along central axes which are substantially positioned at the centers of the individual permanent-magnet attachment portions 3a in the core units 2 and the pilot holes 4 and the rotor keyways 6 are disposed so as to be positionally shifted from each other in the circumferential direction.

More specifically, in the present embodiment, a configuration is used, in which the pilot holes 4 are provided instead of the swage portions that exist at positions close to central axes which are substantially positioned at the centers of the individual permanent-magnet attachment portions in the first embodiment. Regarding the pilot holes 4 and the swage portions 7 that are disposed in the core units 2, the pilot holes 4 are disposed (at positions that are a radius RO distant from a center O of an arc of the core units 2) along central axes that are positioned substantially at the centers of the individual permanent-magnet attachment portions 3a in the radial directions extending from the center of the arc of the core units 2 to the permanent-magnet attachment portions 3a. The swage portions 7 are disposed (at positions that are a radius R2 distant from the center O of the arc) so as to be positioned substantially at the ends of the individual permanent-magnet attachment portions 3a in the radial directions extending from the center of the arc of the core units 2 to the permanent-magnet attachment portions 3a. The pilot holes 4 are provided closer to an inner circumferential side of the permanent-magnet attachment portions 3a than the swage portions 7 (R0>R2).

Furthermore, the positional relationship between the swage portions 7 that are disposed (at positions that are the radius R2 distant from the center O of the arc) so as to be positioned substantially at the ends of the individual permanent-magnet attachment portions 3a in the radial directions and the swage portions 7 that are disposed (at positions that are the radius R1 distant from the center O of the arc) so as to be positioned closer to the central axes, which are positioned substantially at the centers of the individual permanent-magnet attachment portions 3a, than the swage portions 7 that are disposed at positions which are the radius R2 distant from the center O of the arc is R1>R2.

Accordingly, in the fourth embodiment, the pilot holes 4 are formed along central axes that are substantially positioned at the centers of the permanent-magnet attachment portions 3a in the core units 2. Thus, necessary magnetic characteristics of a motor can be ensured by using the arrangement of the positions of the pilot holes and the positions of the swage portions of the laminated spiral core that is determined with consideration of magnetic flux densities and magnetic flux flows. In addition, the amount of core material can be reduced to a minimum necessary for the laminated spiral core. Moreover, the laminated spiral core can be inexpensively produced with an excellent productivity. Furthermore, the laminated spiral core that is realized using the most appropriate arrangement of the positions of the swage portions can minimize the influences of the magnetic characteristics to the output performance of the motor.

Fifth Embodiment

Figure 5A:
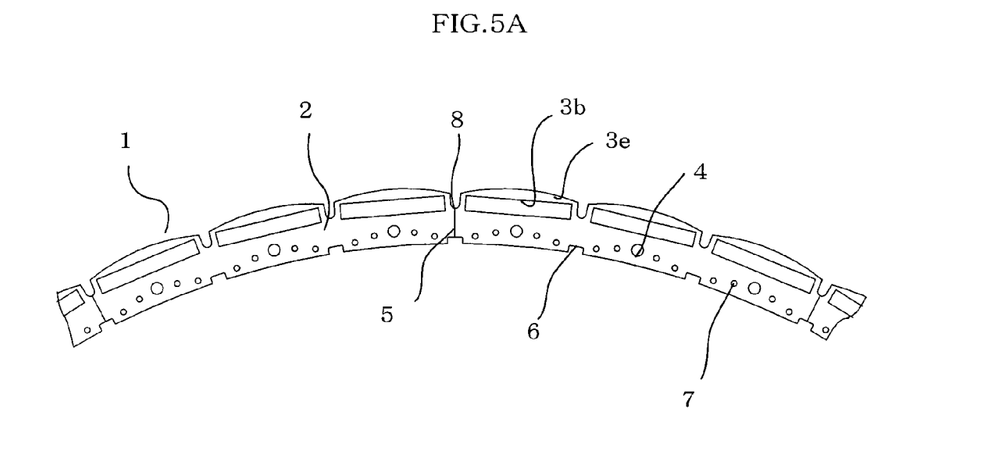
FIG. 5A is a front view of core units constituting a laminated spiral core, which is used for a rotor, according to a fifth embodiment of the present invention, and illustrates a state in which the arc-shaped core units that are produced by being punched out of a hoop material are bent and contact each other.
Figure 5B:
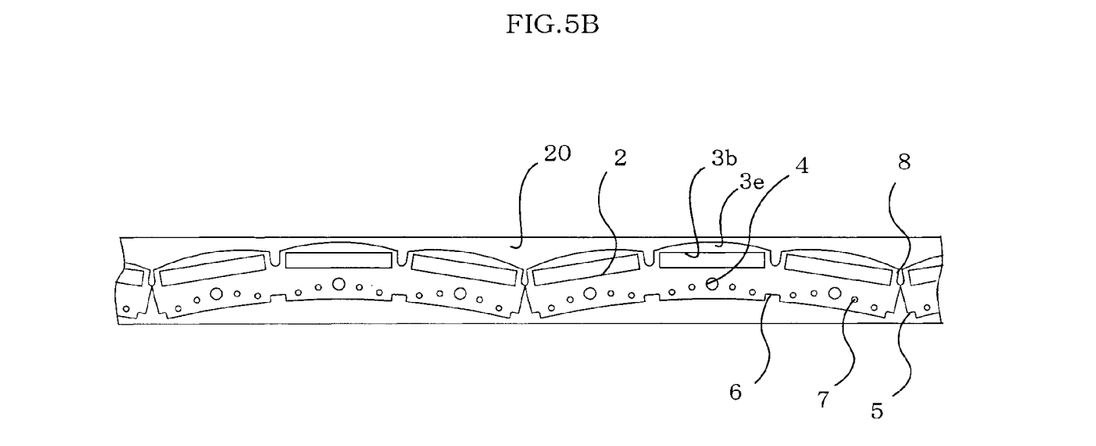
FIG. 5B is a front view of the arc-shaped core units, which are illustrated in FIG. 5A, in a state in which the core units are to be punched out of the hoop material.

FIG. 5A is a front view of core units constituting a laminated spiral core, which is used for a rotor, according to a fifth embodiment of the present invention, and illustrates a state in which the arc-shaped core units that are produced by being punched out of a hoop material are bent and contact each other. FIG. 5B is a front view of the arc-shaped core units, which are illustrated in FIG. 5A, in a state in which the core units are to be punched out of the hoop material.

The differences between the fifth embodiment and the second embodiment are that the pilot holes 4 are formed along central axes which are substantially positioned at the centers of the individual permanent-magnet insertion holes 3b in the core units 2, and that the pilot holes 4 and the rotor keyways 6 are disposed so as to be positionally shifted from each other in the circumferential direction.

Accordingly, in the fifth embodiment, the pilot holes 4 are formed along central axes that are substantially positioned at the centers of the individual permanent-magnet insertion holes 3b in the core units 2. Thus, necessary magnetic characteristics of a motor can be ensured by using the arrangement of the positions of the pilot holes and the positions of the swage portions of the laminated spiral core that is determined with consideration of magnetic flux densities and magnetic flux flows. In addition, the amount of core material can be reduced to a minimum necessary for the laminated spiral core. Moreover, the laminated spiral core can be inexpensively produced with an excellent productivity. Furthermore, the laminated spiral core that is realized using the most appropriate arrangement of the positions of the swage portions can minimize the influences of the magnetic characteristics to the output performance of the motor.

Sixth Embodiment

Figure 6A:
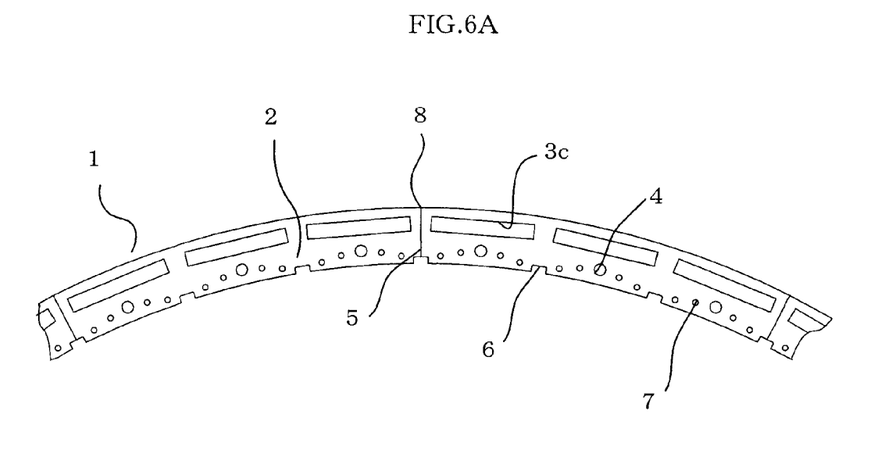
FIG. 6A is a front view of core units constituting a laminated spiral core, which is used for a rotor, according to a sixth embodiment of the present invention, and illustrates a state in which the arc-shaped core units that are produced by being punched out of a hoop material are bent and contact each other.
Figure 6B:
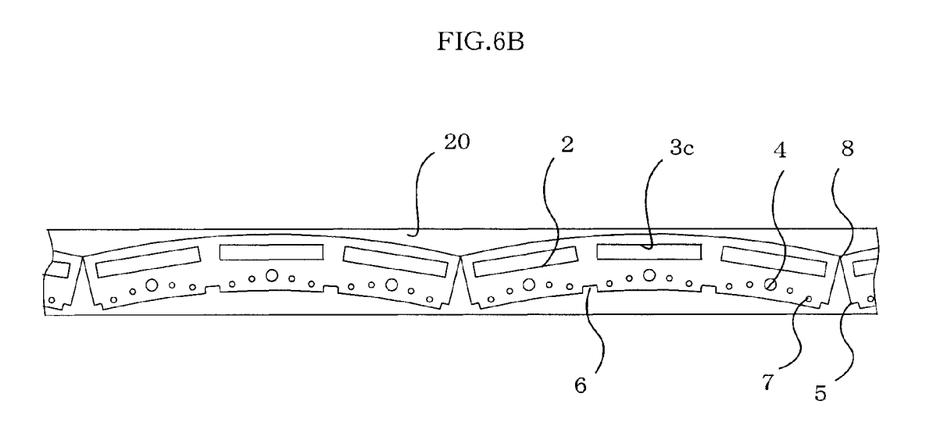
FIG. 6B is a front view of the arc-shaped core units, which are illustrated in FIG. 6A, in a state in which the core units are to be punched out of the hoop material.

FIG. 6A is a front view of core units constituting a laminated spiral core, which is used for a rotor, according to a sixth embodiment of the present invention, and illustrates a state in which the arc-shaped core units that are produced by being punched out of a hoop material are bent and contact each other. FIG. 6B is a front view of the arc-shaped core units, which are illustrated in FIG. 6A, in a state in which the core units are to be punched out of the hoop material.

The differences between the sixth embodiment and the third embodiment are that the pilot holes 4 are formed along central axes which are substantially positioned at the centers of the individual permanent-magnet insertion holes 3c in the core units 2, and that the pilot holes 4 and the rotor keyways 6 are disposed so as to be positionally shifted from each other in the circumferential direction.

Accordingly, in the sixth embodiment, the pilot holes 4 are formed along central axes that are substantially positioned at the centers of the individual permanent-magnet insertion holes 3c in the core units 2. Thus, necessary magnetic characteristics of a motor can be ensured by using the arrangement of the positions of the pilot holes and the positions of the swage portions of the laminated spiral core that is determined with consideration of magnetic flux densities and magnetic flux flows. In addition, the amount of core material can be reduced to a minimum necessary for the laminated spiral core. Moreover, the laminated spiral core can be inexpensively produced with an excellent productivity. Furthermore, the laminated spiral core that is realized using the most appropriate arrangement of the positions of the swage portions can minimize the influences of the magnetic characteristics to the output performance of the motor.

Seventh Embodiment

Figure 7:
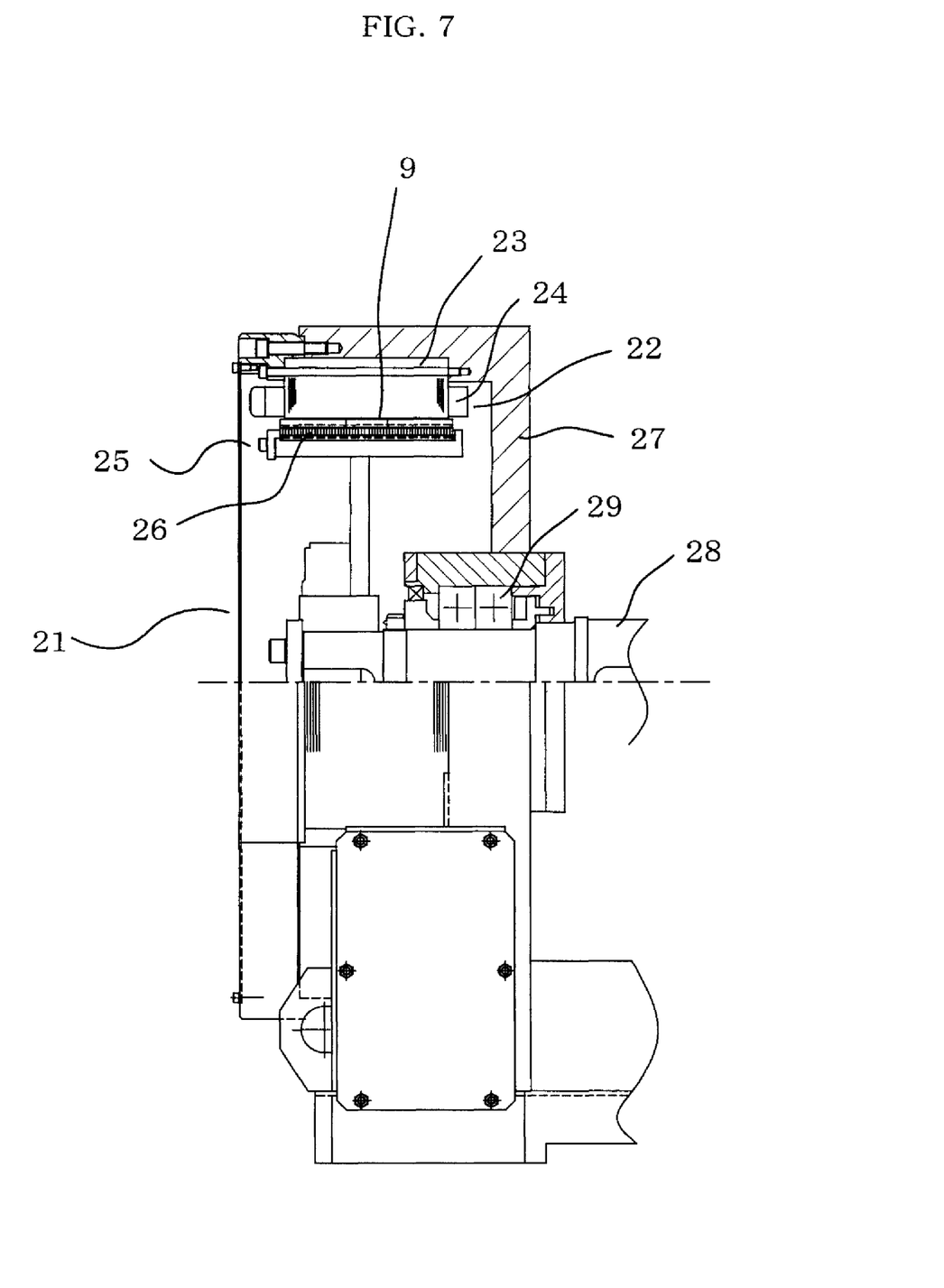
FIG. 7 is a sectional side view of a motor, which uses a laminated spiral core used for a rotor, according to a seventh embodiment of the present invention, and illustrates a state in which the motor is incorporated into a motor housing.
Figure 8:
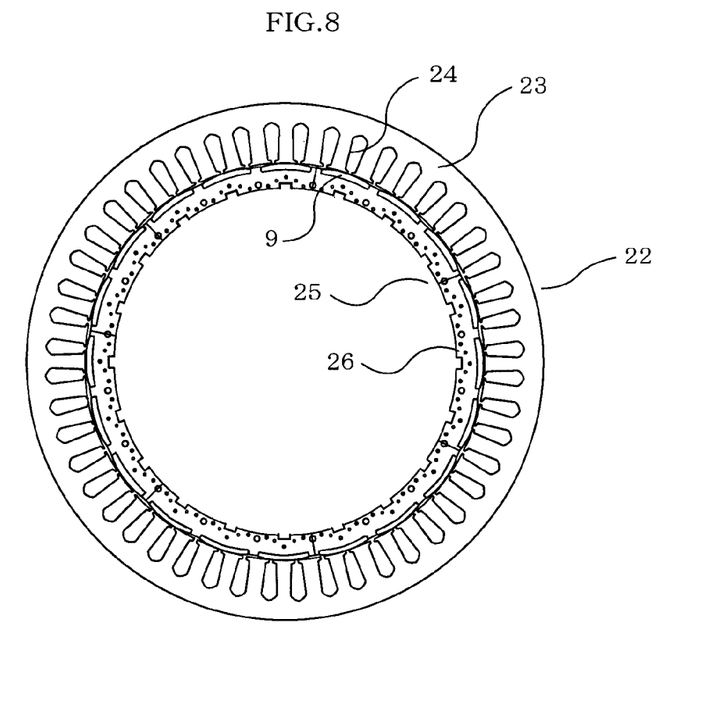
FIG. 8 is a sectional front view of the motor illustrated in FIG. 7.
Figure 9:
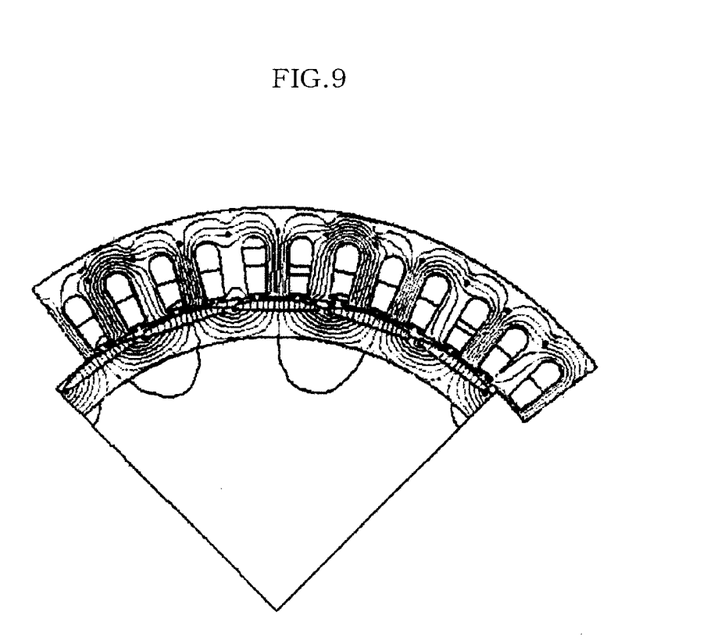
FIG. 9 is an analysis diagram of magnetic fields of the motor that is applied in the present embodiment.

FIG. 7 is a sectional side view of a motor, which uses a laminated spiral core used for a rotor, according to a seventh embodiment of the present invention, and illustrates a state in which the motor is incorporated into a motor housing. FIG. 8 is a sectional front view of the motor illustrated in FIG. 7. FIG. 9 is an analysis diagram of magnetic fields of the motor that is applied in the present embodiment.

In FIGS. 7 and 8, reference numeral 9 denotes a permanent magnet. Reference numeral 21 denotes a motor. Reference numeral 22 denotes a stator. Reference numeral 23 denotes a stator core. Reference numeral 24 denotes a stator coil. Reference numeral 25 denotes a rotor. Reference numeral 26 denotes a rotor core. Reference numeral 27 denotes a motor housing. Reference numeral 28 denotes a shaft. Reference numeral 29 denotes a bearing.

FIGS. 7 and 8 illustrate an example of a permanent-magnet synchronous motor in which the core units described in one of the first to sixth embodiments are applied to a rotor core. The rotor 25 (a permanent-magnet-synchronous-motor rotor) includes the rotor core 26, which is produced as a laminated product by joining a predetermined number of core units to each other to obtain a laminated spiral core and by performing swage-joining on the laminated spiral core, and the permanent magnets 9, which are disposed in permanent-magnet attachment portions (not illustrated) of the rotor core 26 and which serve as field magnets. Here, the rotor core 26, which is a cylindrical laminated product that is formed by swage-joining, is attached to the shaft 28 by being fitted and fixed.

Furthermore, the stator 22 includes the stator core 23 and the stator coils 24 that are wound around the stator core 23. The rotor 25 is disposed so as to oppose the stator 22 with a gap therebetween. Here, as in the case of the rotor, the stator core is formed as a cylindrical laminated product by performing swage-joining on a laminated spiral core having spirally stacked layers, and the stator uses the stator core. Because a laminated spiral core is used for the stator as in the case of the rotor, as a matter of course, the laminated spiral core can be inexpensively produced with an excellent productivity, and this leads to a reduction in cost of the entire motor.

According to the analysis diagram, which is FIG. 9, of magnetic fields of the motor that is applied in the present embodiment, magnetic flux paths at the positions of the swage portions are generated so that magnetic flux densities at the positions of the swage portions are lower than those at the positions of the other portions. Thus, compared with the other portions at positions other than the positions of the swage portions, the swage portions are positioned so as not to be comparatively influenced by the magnetic flux paths of the rotor (provided at positions where an influence that the magnetic flux paths of the rotor have on portions of the core units is minimal), thereby realizing the most appropriate arrangement of the positions of the swage portions.

In the seventh embodiment, the rotor core in which the most appropriate arrangement of the positions of the swage portions is realized is applied to a permanent-magnet-synchronous-motor rotor. Thus, the influences of the magnetic flux paths to the output performance of the motor can be minimized.

Note that an example of a motor that uses the laminated spiral core as a rotor core is described as a permanent-magnet synchronous dynamo-electric machine according to the present embodiment. However, when the present embodiment is implemented, instead of a motor, an electric generator, which is a dynamo-electric machine, that produces multiphase outputs having duality can be applied.

Furthermore, an example is described, in which the swage portions are provided in the core units in a wave-like arrangement so as to be opposite the permanent-magnet attachment portions and provided at positions where an influence that the magnetic flux paths of the rotor have on portions of the core units is minimal. However, when the shape of magnets or an arrangement changes, the swage portions may be disposed in a V-shaped arrangement or a W-shaped arrangement instead of a wave-like arrangement.

Moreover, for the core units constituting the laminated spiral core, an example in which an inner-rotor-type dynamo-electric machine is supposed is described. An inner-rotor-type dynamo-electric machine is configured so that a rotor is disposed inside a stator and rotates. However, an outer-rotor-type dynamo-electric machine may be employed. An outer-rotor-type dynamo-electric machine is configured so that a rotor is disposed outside a stator and rotates. In a case of an outer-rotor-type dynamo-electric machine, magnet attachment portions are disposed on an inner circumferential side of core units, and swage portions are disposed on an outer circumferential side of the magnet attachment portions.

Additionally, regarding the stator core, a case in which a laminated spiral core is used is described. The stator core is not limited thereto. A stator using an integral core having an annular shape or a stator using a combination of segment cores may be used.

In the present embodiment, in the laminated spiral core used for a rotor, the swage portions are provided in the core units in a wave-like arrangement so as to be opposite the permanent-magnet attachment portions and provided at positions where an influence that the magnetic flux paths of the rotor have on portions of the core units is minimal. Accordingly, the influences of the magnetic flux paths to the output performance of the motor can be minimized. As a result, the present embodiment can be applied to a permanent-magnet synchronous dynamo-electric machine that can obtain a high torque even in a case of activation or a case of sharp change in load and that can make the efficiency excellent. Thus, the permanent-magnet synchronous dynamo-electric machine may be used as a motor that drives wheels, or may be useful to be used as an electric generator of a vehicle (a vehicle such as a hybrid electric vehicle, an electric vehicle, or a fuel cell vehicle), as a drive motor or electric generator that is used for a railway vehicle, or as an electronic generator that is used for an uninterruptible-power-supply electric-generator vehicle. Additionally, the permanent-magnet synchronous dynamo-electric machine may be useful to be used as a motor, which drives a sheave, of an elevator, a winch, or a lift used for a multi-story parking lot, or may be useful to be used as a drive motor of an industrial machine such as a processing machine such as a machine tool, an injection molding machine, or semiconductor equipment.

Obviously, numerous modifications and variations of the present invention are possible in light of the above teachings. It is therefore to be understood that within the scope of the appended claims, the invention may be practiced otherwise than as specifically described herein.

What is claimed is:

1. A laminated spiral core comprising:
   core units to form a rotor core, the core units having permanent-magnet attachment portions in which permanent magnets are to be disposed, each of the core units having an arc shape; and
   a plurality of swage portions to connect the core units by swage joining when the core units are spirally stacked in a predetermined number of layers, the plurality of swage portions provided in the core units in a wave-shape to face the permanent-magnet attachment portions,
   wherein a swage portion among the plurality of swage portions which is disposed along a substantially central axis of each of the permanent-magnet attachment portions extending in a radial direction from a center of an arc of the core units is closer to each of the permanent-magnet attachment portions than a swage portion among the plurality of swage portions which is positioned substantially at each of ends in a circumference direction of the permanent-magnet attachment portions.

2. The laminated spiral core according to claim 1, wherein the core units comprise
   a pilot hole to position the core units that are spirally stacked in the layers, and
   a rotor keyway on a face of each of the core units opposite in the radial direction to another face of each of the core units on which the permanent-magnet attachment portions are formed, the rotor keyway being to position the rotor core when the rotor core is fitted to a shaft.

3. The laminated spiral core according to claim 2, wherein the pilot hole is formed along a substantially central axis of each of the permanent-magnet attachment portions in the core units.

4. The laminated spiral core according to claim 2, wherein the pilot hole and the rotor keyway are disposed so as to be shifted from each other in a circumferential direction.

5. The laminated spiral core according to claim 1, wherein the permanent-magnet attachment portions comprise permanent-magnet insertion holes that are formed inside the core units in a radial direction.

6. The laminated spiral core according to claim 1, wherein the core units comprise
   a pilot hole to position the core units that are spirally stacked in the layers, and
   a rotor keyway on a face of each of the core units opposite in the radial direction to another face of each of the core units on which the permanent-magnet attachment portions are formed, the rotor keyway being to position the rotor core when the rotor core is fitted to a shaft.

7. The laminated spiral core according to claim 1, wherein the permanent-magnet attachment portions are formed on surfaces of the core units in a radial direction.

8. The laminated spiral core according to claim 1, wherein the permanent-magnet attachment portions comprise permanent-magnet insertion holes that are formed inside the core units in a radial direction.

9. A laminated spiral core comprising:
   core units to form a rotor core, the core units having permanent-magnet attachment portions in which permanent magnets are to be disposed each of the core units having an arc shape; and
   a plurality of swage portions to connect the core units by swage-joining when the core units are spirally stacked in a predetermined number of layers, the plurality of swage portions provided in the core units in a wave-shape to face the permanent magnet attachment portions, wherein the core units comprise
  a pilot hole to position the core units that are spirally stacked in the layers, and
  a rotor keyway on a face of each of the core units opposite in the radial direction to another face of each of the core units on which the permanent-magnet attachment portions are formed, the rotor keyway being to position the rotor core when the rotor core is fitted to a shaft, and
wherein the pilot hole is formed along a substantially central axis between the permanent-magnet attachment portions in the core units.

10. A laminated spiral core comprising:
core units to form a rotor core, the core units having permanent-magnet attachment portions in which permanent magnets are to be disposed each of the core units having an arc shape; and
a plurality of swage portions to connect the core units by swage-joining when the core units are spirally stacked in a predetermined number of layers, the plurality of swage portions provided in the core units in a wave-shape to face the permanent-magnet attachment portions,
wherein the permanent-magnet attachment portions are formed on surfaces of the core units in a radial direction.

11. A laminated spiral core comprising:
core units to form a rotor core, the core units having permanent-magnet attachment portions in which permanent magnets are to be disposed each of the core units having an arc shape; and
a plurality of swage portions to connect the core units by swage-joining when the core units are spirally stacked in a predetermined number of layers, the plurality of swage portions provided in the core units in a wave-shape to face the permanent-magnet attachment portions,
wherein the permanent-magnet attachment portions comprise permanent-magnet insertion holes that are formed inside the core units in a radial direction, and
wherein only magnetic-pole portions of the core units in which the permanent-magnet insertion holes are provided are formed so as to project from the core units in the radial direction.

12. A dynamo-electric-machine rotor comprising:
a rotor core formed as a cylindrical laminated product by performing swage joining on a laminated spiral core having spirally stacked layers, the laminated spiral core comprising:
  core units to form a rotor core, the core units having permanent-magnet attachment portions in which permanent magnets are to be disposed, each of the core units having an arc shape; and
  a plurality of swage portions to connect the core units by swage joining when the core units are spirally stacked in a predetermined number of layers, the plurality of swage portions provided in the core units in a wave-shape to face the permanent-magnet attachment portions; and
permanent magnets that are disposed in the permanent-magnet attachment portions of the rotor core and that serve as field magnets,
wherein a swage portion among the plurality of swage portions which is disposed along a substantially central axis of each of the permanent-magnet attachment portions extending in a radial direction from a center of an arc of the core units is closer to each of the permanent-magnet attachment portions than a swage portion among the plurality of swage portions which is positioned substantially at each of ends in a circumference direction of the permanent-magnet attachment portions.

13. A dynamo-electric machine comprising:
a rotor comprising:
  a rotor core formed as a cylindrical laminated product by performing swage-joining on a laminated spiral core having spirally stacked layers, the laminated spiral core comprising:
    core units to form a rotor core, the core units having permanent-magnet attachment portions in which permanent magnets are to be disposed, each of the core units having an arc shape; and
    a plurality of swage portions to connect the core units by swage joining when the core units are spirally stacked in a predetermined number of layers, the plurality of swage portions provided in the core units in a wave-shape to face the permanent-magnet attachment portions; and
  permanent magnets that are disposed in the permanent-magnet attachment portions of the rotor core and that serve as field magnets; and
a stator that is disposed so as to oppose the rotor with a gap therebetween,
wherein a swage portion among the plurality of swage portions which is disposed along a substantially central axis of each of the permanent-magnet attachment portions extending in a radial direction from a center of an arc of the core units is closer to each of the permanent-magnet attachment portions than a swage portion among the plurality of swage portions which is positioned substantially at each of ends in a circumference direction of the permanent-magnet attachment portions.

14. The dynamo-electric machine according to claim 13, wherein the stator comprises a stator core that is formed as a cylindrical laminated product by performing swage-joining on a laminated spiral core having spirally stacked layers.

* * * * *